(12) United States Patent
Shen et al.

(10) Patent No.: US 12,526,219 B2
(45) Date of Patent: *Jan. 13, 2026

(54) ACCURATELY IDENTIFYING EXECUTION TIME OF PERFORMANCE TEST

(71) Applicant: International Business Machines Corporation, Armonk, NY (US)

(72) Inventors: Bo Shen, Xi'an (CN); Yao Dong Liu, Xi'an (CN); Jing James Xu, Xi'an (CN); Lei Gao, Xi'an (CN); Yan Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/985,066

(22) Filed: Nov. 10, 2022

(65) Prior Publication Data

US 2023/0155916 A1 May 18, 2023

Related U.S. Application Data

(63) Continuation of application No. 17/530,050, filed on Nov. 18, 2021, now Pat. No. 11,570,082.

(51) Int. Cl.
*H04L 43/50* (2022.01)
*G06F 17/18* (2006.01)
(Continued)

(52) U.S. Cl.
CPC .............. *H04L 43/50* (2013.01); *G06F 17/18* (2013.01); *H04L 43/0817* (2013.01); *H04L 43/0864* (2013.01)

(58) Field of Classification Search
CPC ... H04L 43/50; H04L 43/045; H04L 43/0817; H04L 43/0864; H04L 41/145; H04L 41/147; H04L 43/0852; G06F 17/18
See application file for complete search history.

(56) References Cited

U.S. PATENT DOCUMENTS 7,818,422 B2 * 10/2010 Patiejunas ........... H04L 43/0864
709/224
9,686,169 B2 6/2017 Formby et al.
(Continued)

OTHER PUBLICATIONS

Chen et al., "Link Gradients: Predicting the Impact of Network Latency on Multitier Applications," IEEE Infocom, Rio de Janeiro, Brazil, Apr. 19-25, 2009, pp. 1-9.
(Continued)

*Primary Examiner* — Anh Nguyen
(74) *Attorney, Agent, or Firm* — Shackelford, McKinley & Norton, LLP; Robert A. Voigt, Jr.

(57) ABSTRACT

A computer-implemented method, system and computer program product for accurately identifying an execution time of a performance test. Network latency data is grouped into clustered groups of network latency data. Furthermore, the performance test execution times for the same group of performance tests run in the local and remote cluster environments are obtained. The test execution times impacted by network latency (compensation times) are then determined based on such obtained performance test execution times in the local and remote cluster environments. Such compensation times are then grouped into clustered groups of compensation times. A regression model is built to predict a performance test execution time impacted by network latency (compensation time) using the clustered groups of network latency data and compensation times. The execution time of a performance test run in the remote cluster environment is then generated that takes into consideration the compensation time predicted by the regression model.

20 Claims, 9 Drawing Sheets

(51) Int. Cl.
*H04L 43/0817* (2022.01)
*H04L 43/0864* (2022.01)

(56) References Cited

U.S. PATENT DOCUMENTS

| | | | | |
|---|---|---|---|---|
| 9,811,445 | B2* | 11/2017 | Moretto | G06F 11/34 |
| 11,063,738 | B1* | 7/2021 | Wang | H04L 7/0008 |
| 11,570,082 | B1 | 1/2023 | Shen et al. | |
| 12,010,007 | B1* | 6/2024 | Wallace | H04L 43/16 |
| 2007/0258378 | A1* | 11/2007 | Hamilton | G01R 31/31725 |
| | | | | 370/503 |
| 2011/0145795 | A1* | 6/2011 | Khanapurkar | G06F 11/3466 |
| | | | | 717/126 |
| 2015/0341211 | A1* | 11/2015 | Saha | H04L 41/0813 |
| | | | | 709/221 |
| 2022/0210045 | A1* | 6/2022 | O'Brien | H04L 67/101 |

OTHER PUBLICATIONS

Anonymously, "Fixed Latency Syscall Emulation Layer for Performance Monitoring," ip.com, ip.com No. IPCOM000022503D, Mar. 18, 2004, pp. 1-3.

Malik et al., "Latency Based Dynamic Grouping Aware Cloud Scheduling," 26th IEEE International Conference on Advanced Information Networking and Applications Workshops, Fukuoka, Japan, Mar. 2012, pp. 1190-1195.

Grant et al., "Overtime: A Tool for Analyzing Performance Variation due to Network Interference," ExaMPI'15: Proceedings of the 3rd Workshop on Exascale MPI, Nov. 2015, pp. 1-10.

Sabet et al., "A Latency Compensation Technique Based on Game Characteristics to Mitigate the Influence of Delay on Cloud Gaming Quality of Experience," Proceedings of the 11th ACM Multimedia Systems Conference, May 2020, pp. 15-25, see Abstract.

List of IBM Patents or Patent Applications Treated as Related, Dec. 9, 2022, pp. 1-2.

* cited by examiner

| ID | Network Latency with Master (Seconds) | Network Latency between Master and Slave1 (Seconds) | Network Latency between Master and Slave2 (Seconds) | Network Latency between Master and Slave3 (Seconds) | ... | Compensation Time from Network Latency (Minutes) |
|---|---|---|---|---|---|---|
| 1 | 1.182 | 1.002 | 2.893 | 2.215 | ... | 2.23 |
| 2 | 2.283 | 2.337 | 2.129 | 1.891 | ... | 3.12 |
| 3 | 1.575 | 1.432 | 1.667 | 1.987 | ... | 1.12 |
| 4 | 3.238 | 3.523 | 3.899 | 1.127 | ... | 8.53 |
| 5 | 5.217 | 5.569 | 6.123 | 7.873 | ... | 55.12 |
| 6 | 2.491 | 2.172 | 3.133 | 2.578 | ... | 5.59 |
| 7 | 2.755 | 3.001 | 3.235 | 3.131 | ... | 10.62 |
| 8 | 4.113 | 3.779 | 3.991 | 4.005 | ... | 30.29 |
| ... | | | | | | |

FIG. 7

ACCURATELY IDENTIFYING EXECUTION TIME OF PERFORMANCE TEST

TECHNICAL FIELD

The present disclosure relates generally to performance testing, such as performance regression testing, and more particularly to accurately identifying the execution time of a performance test, such as a performance regression test.

BACKGROUND

Performance regression testing is a comparative approach that examines how a software application performs in successive builds. For experts in intelligent test automation, this is performed by simulating a variety of usage scenarios, many of which are tests that place the application into adverse performance conditions. Simplistically, performance regression testing provides feedback on how the performance of the application varies according to recent changes in development.

SUMMARY

In one embodiment of the present disclosure, a computer-implemented method for accurately identifying an execution time of a performance test comprises determining compensation times based on obtained performance test execution times for a group of performance tests run in a remote cluster environment and obtained performance test execution times for the group of performance tests run in a local cluster environment, where each of the compensation times comprises a test execution time impacted by network latency. The method further comprises grouping the compensation times into clustered groups of compensation times using a cluster algorithm. The method additionally comprises building a regression model to predict a performance test execution time impacted by network latency using the clustered groups of compensation times. Furthermore, the method comprises generating the execution time of the performance test run in the remote cluster environment that takes into consideration the performance test execution time impacted by network latency predicted by the regression model.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 7 illustrates the information from the clustered groups of network latency data and the clustered groups of compensation times, which is used by the regression algorithm to build the regression model in accordance with an embodiment of the present disclosure;

DETAILED DESCRIPTION

Figure 1:
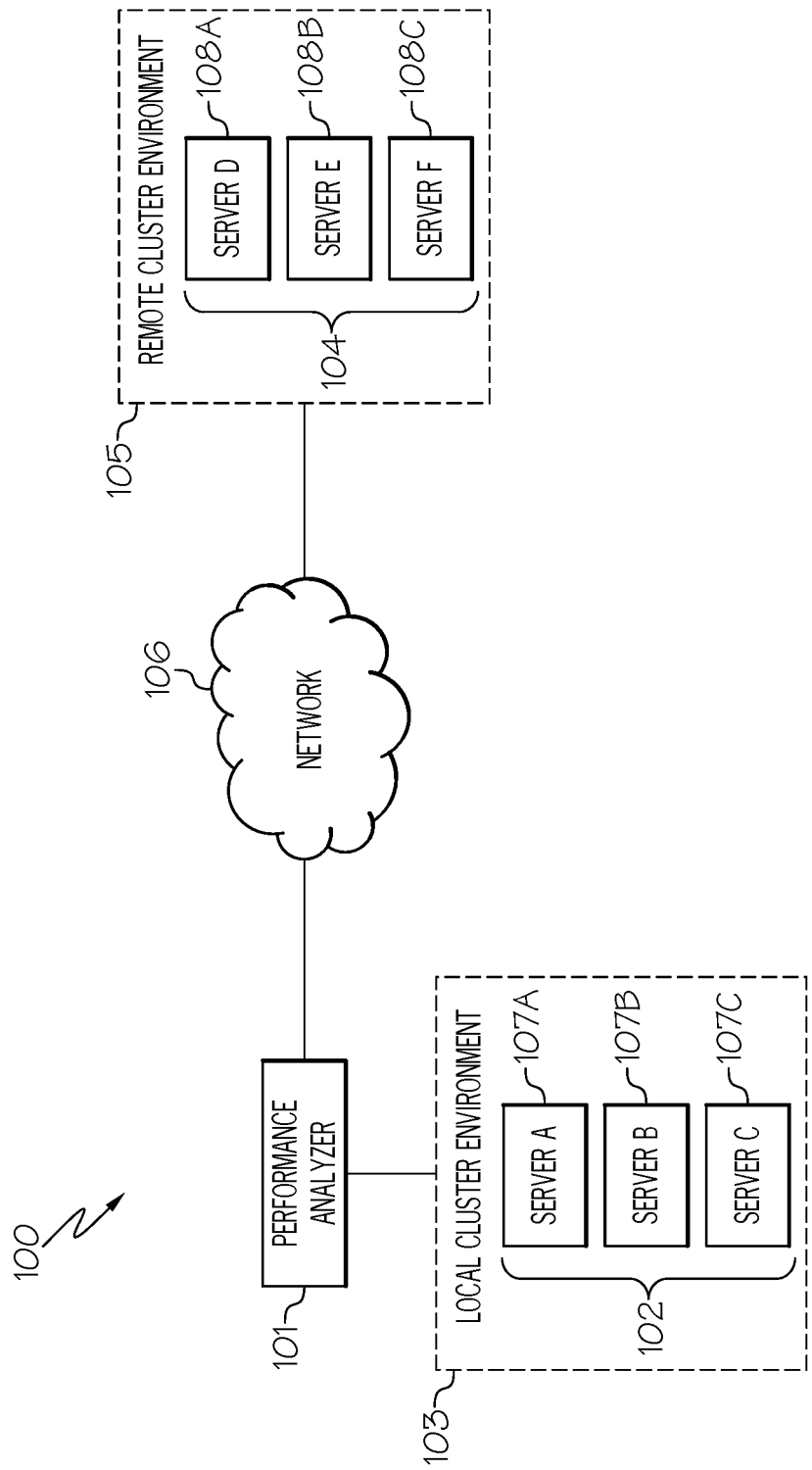
FIG. 1 illustrates a communication system for practicing the principles of the present disclosure in accordance with an embodiment of the present disclosure.

As stated in the Background section, performance regression testing is a comparative approach that examines how a software application performs in successive builds. For experts in intelligent test automation, this is performed by simulating a variety of usage scenarios, many of which are tests that place the application into adverse performance conditions. Simplistically, performance regression testing provides feedback on how the performance of the application varies according to recent changes in development.

When a tester observes a performance regression in the latest build of an application, such as slower page load times, it is typically the result of a recent change to that application. Typically, higher page load time is a negative effect on application performance. A tester will confirm this by comparing the performance of the previous build with the current build.

Such performance regression testing may be performed on a server cluster in a network environment, such as remote network environment, which is used to handle big data (extremely large data sets that may be analyzed computationally to reveal patterns, trends, and associations, especially relating to human behavior and interactions). A "server cluster," as used herein, refers to two or more servers working together. Even though each sever in the server cluster has its own resources, it is displayed in the network under one host name and has only a single Internet Protocol (IP) address. Performance regression tests on such server clusters often require the need to test certain data many times. Such repetitive tests may span a long time for big data.

At times, the running ability of the server cluster will be affected by the network performance, such as network latency, during different periods of time. Furthermore, at times, the tester will observe an increase in the duration of the execution time of the performance test, such as a performance regression test, running on the server cluster. Such an increase in the execution time may be attributed to network performance, such as network latency, which may cause the tester to improperly conclude that the performance test was invalid.

Unfortunately, there is not currently a means for determining the extent of network latency affecting the execution time of the performance test, which may provide clarity as to whether or not the performance test was truly invalid. Additionally, there is not currently a means for obtaining an accurate execution time of the performance test, such as the performance regression test, that takes into account the network latency.

The embodiments of the present disclosure provide a means for determining the extent of network latency affecting the execution time of the performance test thereby accurately identifying the execution time of the performance test, such as the performance regression test.

In some embodiments of the present disclosure, the present disclosure comprises a computer-implemented method, system and computer program product for accurately identifying an execution time of a performance test. In one embodiment of the present disclosure, network latency data is grouped into clustered groups of network latency data using a first cluster algorithm, such as the k-means clustering algorithm, mean-shift clustering algorithm, density-based spatial clustering of applications with noise, expectation-maximization clustering using Gaussian mixture models, agglomerative hierarchical clustering, etc. Furthermore, the performance test execution times for a group of performance tests run in a remote cluster environment are obtained at different times. That is, the performance test execution times of running the performance tests on a server cluster in the remote cluster environment are obtained at different times. Additionally, the performance test execution times for the same group of performance tests run in a local cluster environment are obtained. The test execution times impacted by network latency ("compensation times") are then determined based on such obtained performance test execution times in the local and remote cluster environments. In one embodiment, the compensation time (test execution time impacted by network latency) is equal to the performance test execution time for the performance test run in the remote cluster environment minus the performance test execution time for the same performance test run in the local cluster environment. Such compensation times are then grouped into clustered groups of compensation times using a second cluster algorithm, such as the k-means clustering algorithm, mean-shift clustering algorithm, density-based spatial clustering of applications with noise, expectation-maximization clustering using Gaussian mixture models, agglomerative hierarchical clustering, etc. A regression model is then built to predict a performance test execution time impacted by network latency using the clustered groups of network latency data and the clustered groups of compensation times. The execution time of a performance test run in the remote cluster environment is then generated that takes into consideration the performance test execution time impacted by network latency predicted by the regression model. In this manner, the execution time of the performance test, such as the performance regression test, is more accurate as the network latency is taken into account. Furthermore, in this manner, a tester is able to more correctly determine whether the performance test was valid or invalid.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a performance analyzer 101 configured to perform a performance test, such as a performance regression test, on a server cluster. Such a performance test may be performed on a server cluster 102 in a local cluster environment 103. A "local cluster environment," as used herein, refers to an environment in which server cluster 102 is directly connected to performance analyzer 101. That is, a "local cluster environment," refers to an environment in which server cluster 102 is not connected to performance analyzer 101 via a network. Furthermore, as shown in FIG. 1, such a performance test may be performed on a server cluster 104 in a remote cluster environment 105, such as via a network 106. A "remote cluster environment," as used herein, refers to an environment in which server cluster 104 is remotely connected to performance analyzer 101, such as via a network (e.g., network 106).

Network 106 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

As previously discussed, a "server cluster," as used herein, refers to two or more servers working together. As shown in FIG. 1, local cluster environment 103 includes a server cluster 102, such as servers 107A-107C (identified as "Server A," "Server B," and "Server C," respectively in FIG. 1). Servers 107A-107C may collectively or individually be referred to as servers 107 or server 107, respectively. While FIG. 1 illustrates server cluster 102 in local cluster environment 103 including three servers 107, it is noted that server cluster 102 in local cluster environment 103 may include any number of servers 107.

Furthermore, as shown in FIG. 1, remote cluster environment 105 includes a server cluster 104, such as servers 108A-108C (identified as "Server D," "Server E," and "Server F," respectively in FIG. 1). Servers 108A-108C may collectively or individually be referred to as servers 108 or server 108, respectively. While FIG. 1 illustrates server cluster 104 in remote cluster environment 105 including three servers 108, it is noted that server cluster 104 in remote cluster environment 105 may include any number of servers 108.

In one embodiment, servers 107 in local cluster environment 103 possess substantially the same amount of resources (e.g., same amount of disk space (e.g., 50 GB), same amount of memory size (e.g., 4 GB), same processor speed (e.g., 3 GHz)) as servers 108 in remote cluster environment 105.

In one embodiment, performance analyzer 101 is configured to accurately identify the execution time of a performance test, such as the performance regression test, run on server cluster 104 in remote cluster environment 105, such as by taking into consideration the impact, if any, of network latency. A more detailed description of these and other features will be provided below. Furthermore, a description of the software components of performance analyzer 101 is provided below in connection with FIG. 2 and a description of the hardware configuration of performance analyzer 101 is provided further below in connection with FIG. 3.

System 100 is not to be limited in scope to any one particular network architecture. System 100 may include any number of performance analyzers 101, server clusters 102, 104, environments 103, 105, and networks 106.

A discussion regarding the software components used by performance analyzer 101 for accurately identifying the execution of the performance test, such as the performance regression test, run in remote cluster environment 105 is provided below in connection with FIG. 2.

Figure 2:
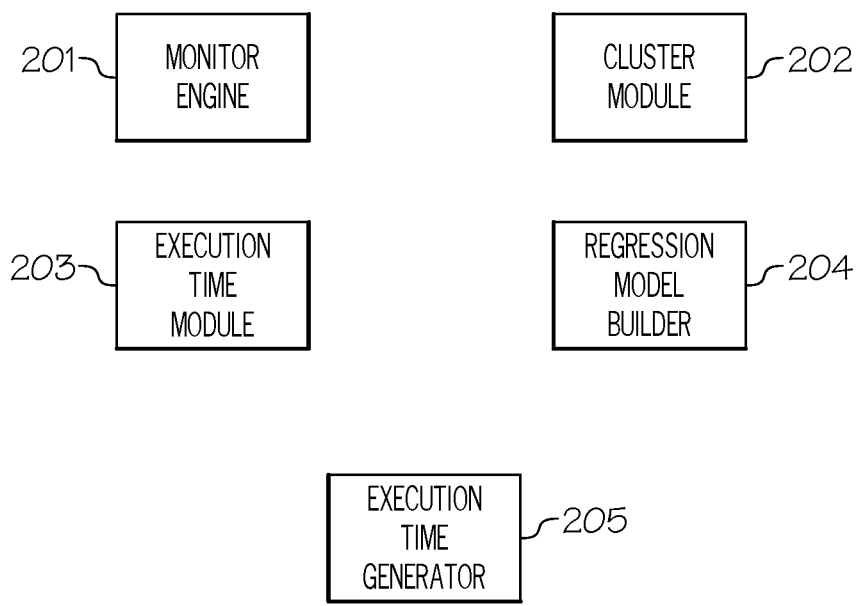
FIG. 2 is a diagram of the software components of the performance analyzer for accurately identifying the execution time of the performance test run in the remote cluster environment in accordance with an embodiment of the present disclosure.

FIG. 2 is a diagram of the software components of performance analyzer 101 (FIG. 1) for accurately identifying the execution time of the performance test, such as the performance regression test, run in remote cluster environment 105 (FIG. 1) in accordance with an embodiment of the present disclosure.

Referring to FIG. 2, in conjunction with FIG. 1, performance analyzer 101 includes a monitor engine 201. Monitor engine 201 is configured to monitor and collect the network latency data during different periods of time, such as the network latency in remote cluster environment 105.

"Network latency," as used herein, refers to delays in communication over a network (e.g., network 106), such as the delay in the amount of time it takes for a packet of data to be captured, transmitted, processed and received at its destination. Such latency may be caused by a variety of reasons, such as insufficient bandwidth, firewall blocking traffic, signal conversion, etc.

In one embodiment, monitor engine 201 monitors and collects the network latency data in remote cluster environment 105 during different periods of time by applying an applet (small application that performs one specific task that runs within the scope of a dedicated engine (201) or a larger program, such as a plug-in) in the test environment 105 to obtain a large number of random network delay data in different time periods. In one embodiment, the applet collects such network latency data via ping (software utility used to test the reachability of a host on an Internet Protocol (IP) network). Ping measures the round trip time for messages sent from the originating host to a destination that are echoed back to the source. In one embodiment, ping operates by sending Internet Control Message Protocol (ICMP) echo request packets to the target host and waiting for an ICMP echo reply. The applet may then report errors, packet loss and a statistical summary of the results, such as the minimum, maximum, the mean route trip times and standard deviation of the mean.

Examples of collecting the network latency data in remote cluster environment 105 using ping include collecting the latency between a client and a master, collecting the latency between master and slaves, etc.

In one embodiment, monitor engine 201 monitors and collects the network latency data during different periods of time, such as the network latency in remote cluster environment 105, using various software tools, including, but not limited to, SolarWinds® Network Performance Monitor, Paessler® Router Traffic Grapher, NetScan Tools, Network-LatencyView from NirSoft, PingPlotter®, SolarWinds® NetFlow Traffic Analyzer, SolarWinds® Network Bandwidth Analyzer Pack, SolarWinds® Engineer's Toolset™, etc.

Performance analyzer 101 further includes a cluster module 202 configured to group collected network latency data using a cluster algorithm and configured to group compensation times using a cluster algorithm. "Compensation time," as used herein, refers to the amount of the test execution time of the performance test, such as the performance regression test, impacted by the network latency.

In one embodiment, cluster module 202 groups the network latency data collected by monitor engine 201 using a cluster algorithm, such as the k-means clustering algorithm, mean-shift clustering algorithm, density-based spatial clustering of applications with noise, expectation-maximization clustering using Gaussian mixture models, agglomerative hierarchical clustering, etc.

In one embodiment, cluster module 202 groups the compensation times, which are determined by execution time module 203 (discussed below), using a cluster algorithm, such as the k-means clustering algorithm, mean-shift clustering algorithm, density-based spatial clustering of applications with noise, expectation-maximization clustering using Gaussian mixture models, agglomerative hierarchical clustering, etc.

Performance analyzer 101 additionally includes an execution time module 203 configured to obtain the performance test execution times for a group of performance tests run in remote cluster environment 105 at different times and obtain the performance test execution times for the same performance tests run in local cluster environment 103. In one embodiment, execution time module 203 runs the same performance test, such as the performance regression test, on server cluster 102 of local cluster environment 103 as on server cluster 104 of remote cluster environment 105 at the same time. In one embodiment, an original version of the performance test is run in either the local cluster environment 103 or the remote cluster environment 105 and a duplicate copy of the performance test is run in the other environment. In this manner, the same performance test is run at the same time in both local cluster environment 103 and remote cluster environment 105.

When such performance tests are run, execution time module 203 obtains the execution time of such performance tests (referred to herein as the "performance test execution time"). In one embodiment, execution time module 203 obtains such execution times using various software tools, including, but not limited to, Linux® Trace Toolkit, worst-case execution time (WCET) tools, Timing Profiler, aiT, Bound-T, METAMOC, OTAWA developed by the University of Toulouse, TuBound, etc.

The performance execution time in local cluster environment 103 should not be affected by network latency since server cluster 102 is directly connected to performance analyzer 101 (not connected to performance analyzer 101 via a network). As a result, such a performance execution time reflects the true performance execution time (execution time of the performance test) when there is no network latency.

By obtaining the performance test execution time in both local cluster environment 103 and remote cluster environment 105 pertaining to the execution of the same performance test in both local cluster environment 103 and remote cluster environment 105, the network latency affecting the execution time for such a performance test ("compensation time") in remote cluster environment 105 may now be determined by subtracting the performance execution time in local cluster environment 103 (not affected with network latency) from the performance execution time in remote cluster environment 105 (affected with network latency).

As a result, execution time module 203 is configured to determine test execution times impacted by network latency (referred to herein as the "compensation times") based on such obtained performance test execution times in both the local and remote cluster environments 103, 105. That is, execution time module 203 determines the compensation times based on the obtained performance test execution times in remote cluster environment 105 and the obtained performance test execution times in local cluster environment 103 for the same performance tests. Each of these compensation times represents a test execution time impacted by network latency as discussed above.

In one embodiment, the compensation time (test execution time impacted by network latency) is equal to the performance test execution time in remote cluster environment 105 minus the performance test execution time in local cluster environment 103 for the same performance test run at the same time in both local cluster environment 103 and remote cluster environment 105. In one embodiment, an original version of the performance test is run in either the local cluster environment 103 or the remote cluster environment 105 and a duplicate copy of the performance test is run in the other environment at the same time. In this manner, the same performance test is run at the same time in both the local cluster environment 103 and remote cluster environment 105.

Furthermore, performance analyzer 101 includes a regression model builder 204 configured to build a regression model to predict the performance test execution time impacted by the network latency (compensation time) using a regression algorithm that uses the clustered groups of network latency data and the clustered groups of compensation times.

For example, in one embodiment, regression model builder 204 builds a regression model using a regression algorithm that uses the clustered groups of network latency data (e.g., network latency between master and slave in seconds) and the clustered groups of compensation times (e.g., compensation times from network latency in seconds). Such clustered groups are then used by a regression algorithm to build a regression model to predict the execution time impacted by the network latency. Examples of such regression algorithms include, but not limited to, linear regression, support vector regression, regression trees, decision tree, lasso regression, random forest, etc.

After the regression model is built, the execution time of a performance test run in remote cluster environment 105 is collected by execution time module 203 as discussed above. For example, execution time module 203 obtains such execution times using various software tools, including, but not limited to, Linux® Trace Toolkit, worst-case execution time (WCET) tools, Timing Profiler, aiT, Bound-T, META-MOC, OTAWA developed by the University of Toulouse, TuBound, etc.

Furthermore, after the regression model is built, monitor engine 201 collects real-time network latency when running the performance test in remote cluster environment 105 as discussed above. For example, monitor engine 201 collects such real-time network latency using various software tools, including, but not limited to, SolarWinds® Network Performance Monitor, Paessler® Router Traffic Grapher, NetScan Tools, NetworkLatencyView from NirSoft, PingPlotter®, SolarWinds® NetFlow Traffic Analyzer, SolarWinds® Network Bandwidth Analyzer Pack, SolarWinds® Engineer's Toolset™, etc.

In one embodiment, regression model builder 204 is configured to predict the amount of execution time of the performance test ("compensation time") that is impacted by the network latency using the regression model using the collected real-time network latency discussed above. Such an amount of execution time of the performance test that is impacted by the network latency that is predicted by the regression model is then subtracted from the collected execution time of the performance test run in remote cluster environment 105, as discussed above, by execution time generator 205 of performance analyzer 101 in order to obtain the accurate execution time of the performance test. Such an execution time of the performance test, such as the performance regression test, generated by execution time generator 205 is now more accurate as the network latency is taken into account. In this manner, a tester may be able to more correctly determine whether the performance test was valid or invalid.

Software tools utilized by execution time generator 205 to obtain the accurate execution time of the performance test run in remote cluster environment 105 by subtracting the compensation time predicted by the regression model from the collected execution time of the performance test run in remote cluster environment 105 include, but not limited to, Time Calc, EZ Time Calculator, Time Calculator by Nummolt, etc.

A further description of these and other functions is provided below in connection with the discussion of the method for accurately identifying the execution time of the performance test (e.g., performance regression test) run in remote cluster environment 105.

Prior to the discussion of the method for accurately identifying the execution time of the performance test (e.g., performance regression test) run in remote cluster environment 105, a description of the hardware configuration of performance analyzer 101 is provided below in connection with FIG. 3.

Figure 3:
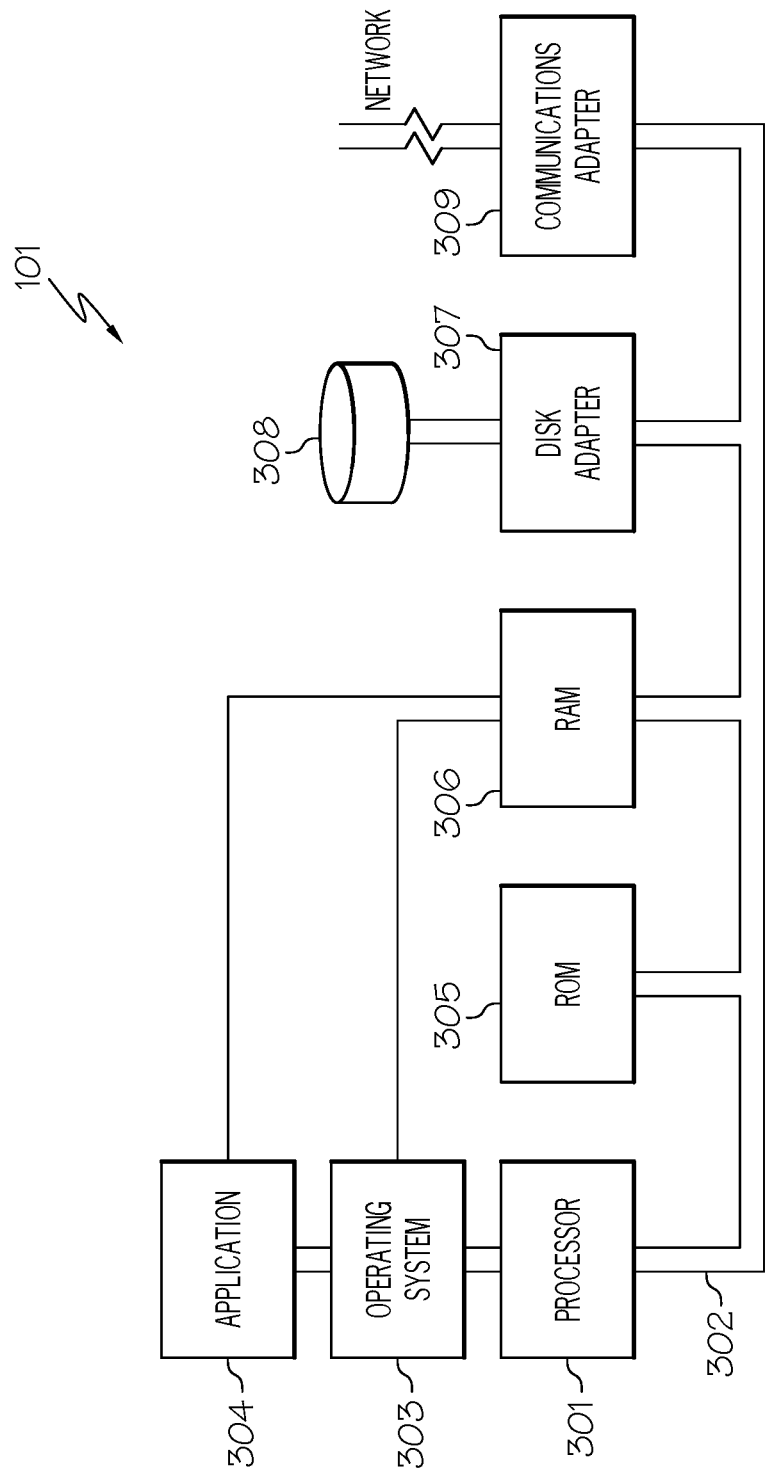
FIG. 3 illustrates an embodiment of the present disclosure of the hardware configuration of the performance analyzer which is representative of a hardware environment for practicing the present disclosure.

Referring now to FIG. 3, FIG. 3 illustrates an embodiment of the present disclosure of the hardware configuration of performance analyzer 101 (FIG. 1) which is representative of a hardware environment for practicing the present disclosure.

Performance analyzer 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, monitor engine 201 (FIG. 1), cluster module 202 (FIG. 2), execution time module 203 (FIG. 2), regression model builder 204 (FIG. 2) and execution time generator 205 (FIG. 2). Furthermore, application 304 may include, for example, a program for accurately identifying the execution time of the performance test (e.g., performance regression test) run in remote cluster environment 105 (FIG. 1) as discussed further below in connection with FIGS. 4-9.

Referring again to FIG. 3, read-only memory ("ROM") 305 is connected to system bus 302 and includes a basic input/output system ("BIOS") that controls certain basic functions of performance analyzer 101. Random access memory ("RAM") 306 and disk adapter 307 are also connected to system bus 302. It should be noted that software components including operating system 303 and application 304 may be loaded into RAM 306, which may be performance analyzer's 101 main memory for execution. Disk adapter 307 may be an integrated drive electronics ("IDE") adapter that communicates with a disk unit 308, e.g., disk drive. It is noted that the program for accurately identifying the execution time of the performance test run in remote cluster environment 105, as discussed further below in connection with FIGS. 4-9, may reside in disk unit 308 or in application 304.

Performance analyzer 101 may further include a communications adapter 309 connected to bus 302. Communications adapter 309 interconnects bus 302 with an outside network (e.g., network 106 of FIG. 1) to communicate with other devices, such as server cluster 102, 104 (FIG. 1).

In one embodiment, application 304 of performance analyzer 101 includes the software components of monitor engine 201, cluster module 202, execution time module 203, regression model builder 204 and execution time generator 205. In one embodiment, such components may be implemented in hardware, where such hardware components would be connected to bus 302. The functions discussed above performed by such components are not generic computer functions. As a result, performance analyzer 101 is a particular machine that is the result of implementing specific, non-generic computer functions.

In one embodiment, the functionality of such software components (e.g., monitor engine 201, cluster module 202, execution time module 203, regression model builder 204 and execution time generator 205) of performance analyzer 101, including the functionality for accurately identifying the execution time of the performance test run in remote cluster environment 105, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, performance regression testing may be performed on a server cluster in a network environment, such as remote network environment, which is used to handle big data (extremely large data sets that may be analyzed computationally to reveal patterns, trends, and associations, especially relating to human behavior and interactions). A "server cluster," as used herein, refers to two or more servers working together. Even though each sever in the server cluster has its own resources, it is displayed in the network under one host name and has only a single Internet Protocol (IP) address. Performance regression tests on such server clusters often require the need to test certain data many times. Such repetitive tests may span a long time for big data. At times, the running ability of the server cluster will be affected by the network performance, such as network latency, during different periods of time. Furthermore, at times, the tester will observe an increase in the duration of the execution time of the performance test, such as a performance regression test, running on the server cluster. Such an increase in the execution time may be attributed to network performance, such as network latency, which may cause the tester to improperly conclude that the performance test was invalid. Unfortunately, there is not currently a means for determining the extent of network latency affecting the execution time of the performance test, which may provide clarity as to whether or not the performance test was truly invalid. Additionally, there is not currently a means for obtaining an accurate execution time of the performance test, such as the performance regression test, that takes into account the network latency.

Figure 4:
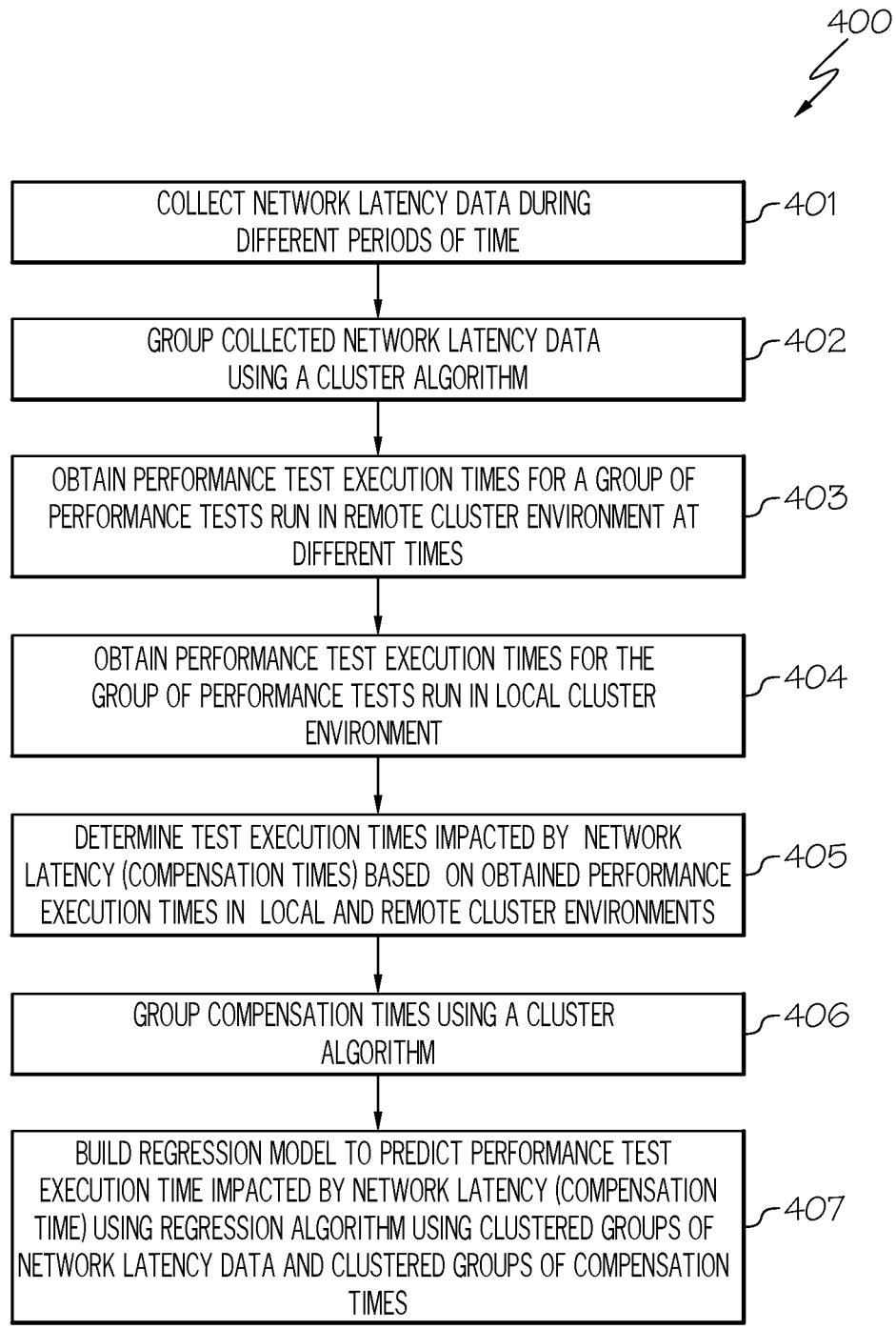
FIG. 4 is a flowchart of a method for predicting the performance test execution time impacted by network latency in accordance with an embodiment of the present disclosure.
Figure 5:
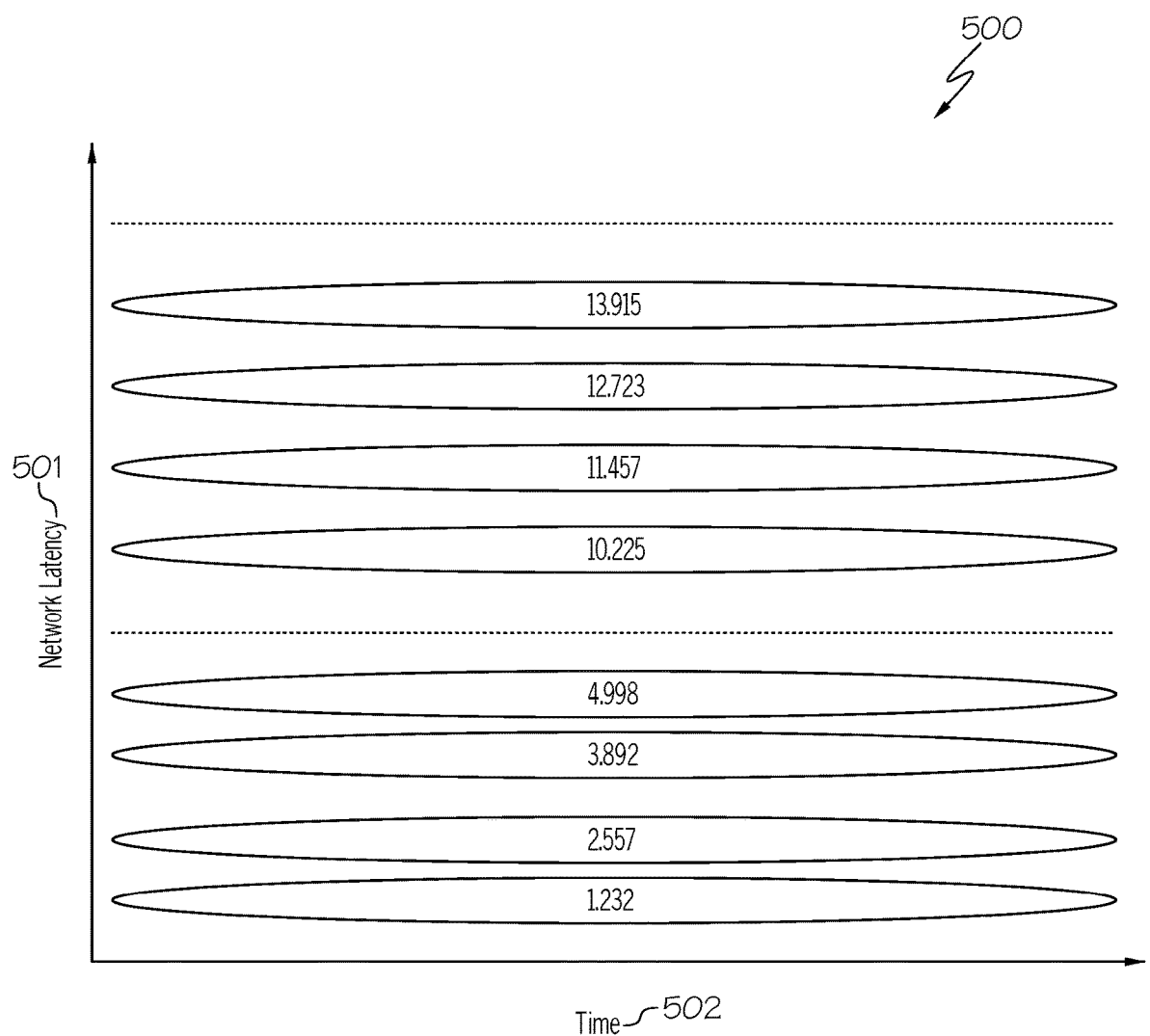
FIG. 5 illustrates the grouping of network latency data into clustered groups of network latency data using a cluster algorithm in accordance with an embodiment of the present disclosure.
Figure 6:
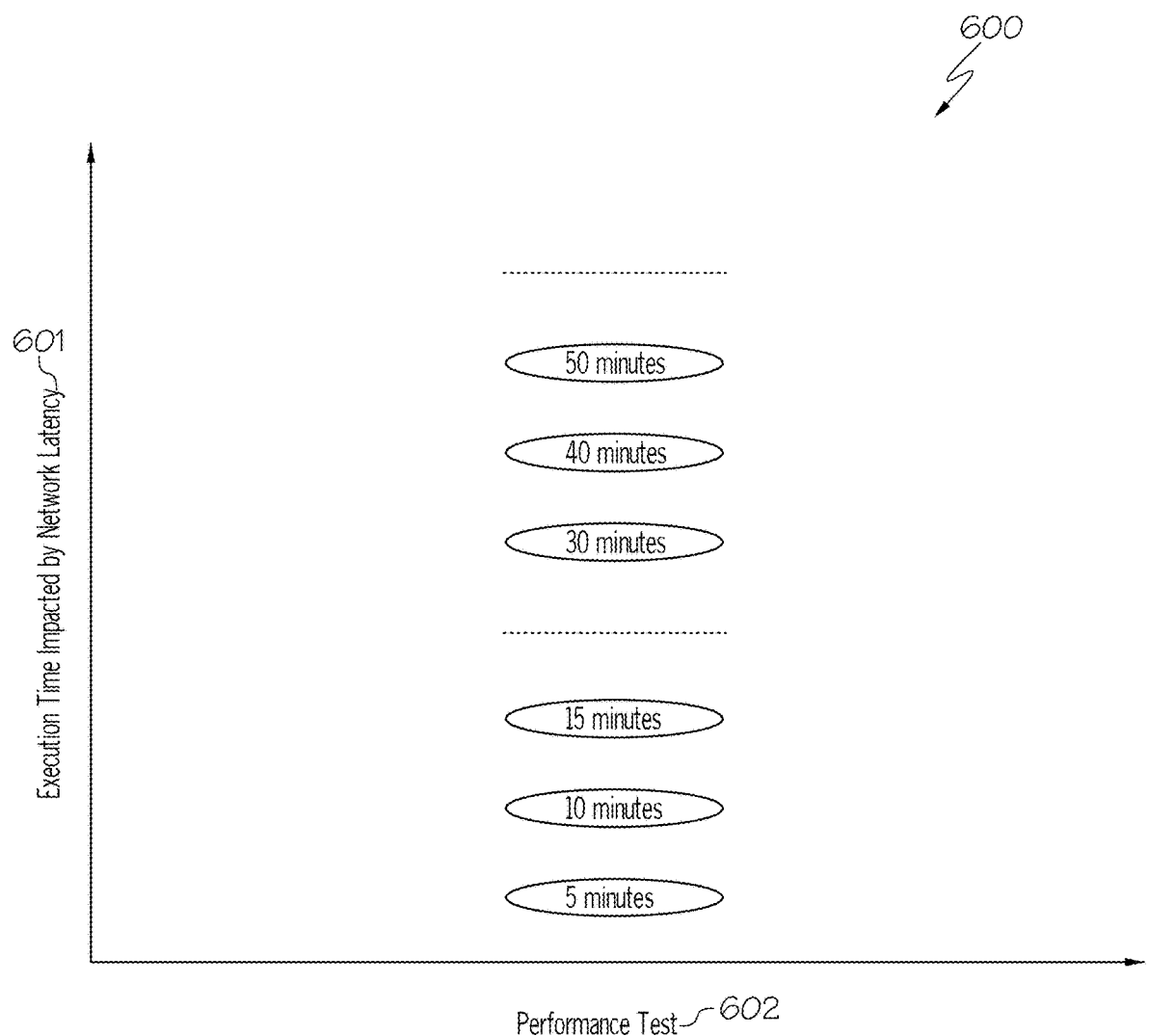
FIG. 6 illustrates the grouping of compensation times into clustered groups of compensation times using a cluster algorithm in accordance with an embodiment of the present disclosure.
Figure 8:
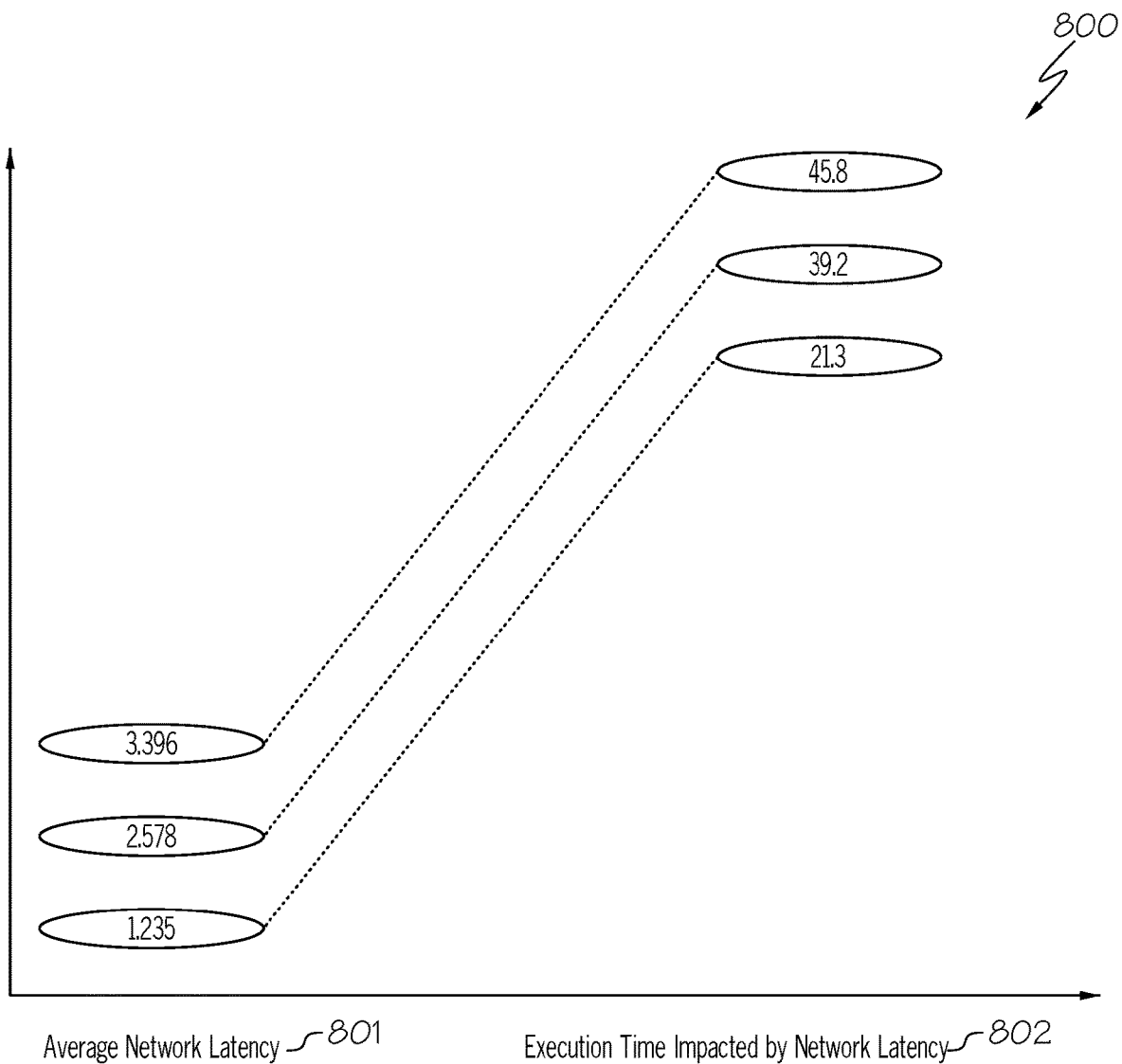
FIG. 8 is a graph illustrating the prediction of the execution time impacted by the network latency (compensation time) by the regression model in accordance with an embodiment of the present disclosure.
Figure 9:
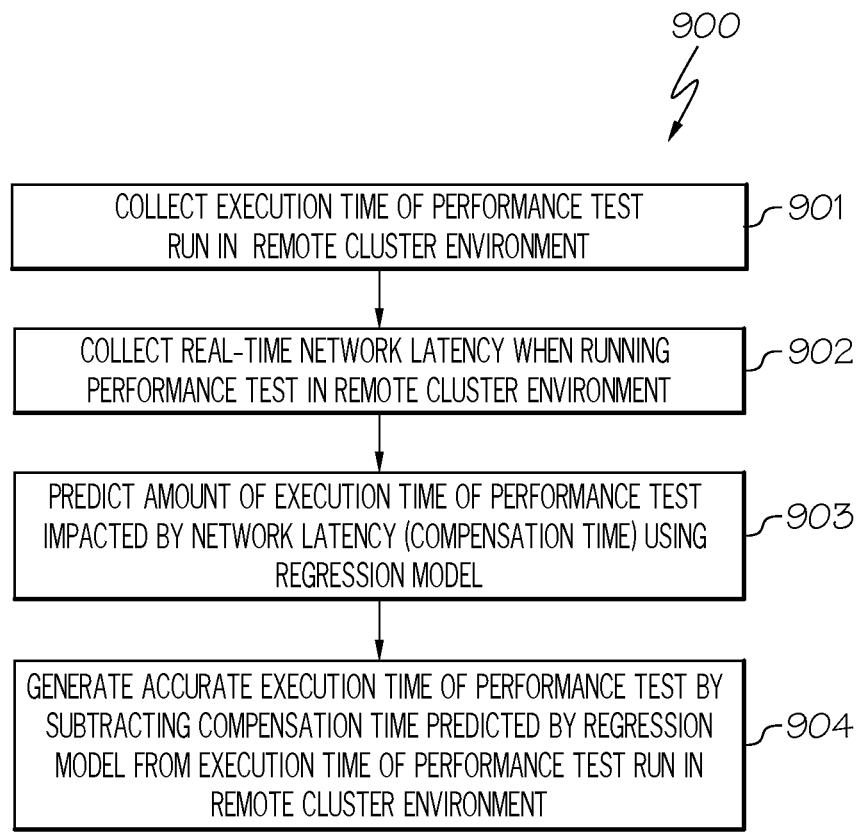
FIG. 9 is a flowchart of a method for accurately identifying the execution time of the performance test run on the server cluster in the remote cluster environment by taking into consideration the impact of network latency in accordance with an embodiment of the present disclosure.

The embodiments of the present disclosure provide a means for determining the extent of network latency affecting the execution time of the performance test thereby accurately identifying the execution time of the performance test, such as the performance regression test, as discussed below in connection with FIGS. 4-9. FIG. 4 is a flowchart of a method for predicting the performance test execution time impacted by network latency. FIG. 5 illustrates the grouping of network latency data into clustered groups of network latency data using a cluster algorithm. FIG. 6 illustrates the grouping of compensation times into clustered groups of compensation times using a cluster algorithm. FIG. 7 illustrates the information from the clustered groups of network latency data and the clustered groups of compensation times, which is used by the regression algorithm to build the regression model. FIG. 8 is a graph illustrating the prediction of the execution time impacted by the network latency (compensation time) by the regression model. FIG. 9 is a flowchart of a method for accurately identifying the execution time of the performance test run on the server cluster in the remote cluster environment by taking into consideration the impact of network latency.

As stated above, FIG. 4 is a flowchart of a method 400 for predicting the performance test execution time impacted by network latency in accordance with an embodiment of the present disclosure.

Referring to FIG. 4, in conjunction with FIGS. 1-3, in operation 401, monitor engine 201 of performance analyzer 101 collects the network latency data during different periods of time, such as the network latency in remote cluster environment 105.

As stated above, "network latency," as used herein, refers to delays in communication over a network (e.g., network 106), such as the delay in the amount of time it takes for a packet of data to be captured, transmitted, processed and received at its destination. Such latency may be caused by a variety of reasons, such as insufficient bandwidth, firewall blocking traffic, signal conversion, etc.

In one embodiment, monitor engine 201 monitors and collects the network latency data in remote cluster environment 105 during different periods of time by applying an applet (small application that performs one specific task that runs within the scope of a dedicated engine (201) or a larger program, such as a plug-in) in the test environment 105 to obtain a large number of random network delay data in different time periods. In one embodiment, the applet collects such network latency data via ping (software utility used to test the reachability of a host on an Internet Protocol (IP) network). Ping measures the round trip time for messages sent from the originating host to a destination that are echoed back to the source. In one embodiment, ping operates by sending Internet Control Message Protocol (ICMP) echo request packets to the target host and waiting for an ICMP echo reply. The applet may then report errors, packet loss and a statistical summary of the results, such as the minimum, maximum, the mean route trip times and standard deviation of the mean.

Examples of collecting the network latency data in remote cluster environment 105 using ping include collecting the latency between a client and a master, collecting the latency between master and slaves, etc.

In one embodiment, monitor engine 201 monitors and collects the network latency data during different periods of time, such as the network latency in remote cluster environment 105, using various software tools, including, but not limited to, SolarWinds® Network Performance Monitor, Paessler® Router Traffic Grapher, NetScan Tools, NetworkLatencyView from NirSoft, PingPlotter®, SolarWinds®

NetFlow Traffic Analyzer, SolarWinds® Network Bandwidth Analyzer Pack, SolarWinds® Engineer's Toolset™, etc.

In operation 402, cluster module 202 of performance analyzer 101 groups the collected network latency data using a cluster algorithm.

As stated above, in one embodiment, cluster module 202 groups the network latency data collected by monitor engine 201 using a cluster algorithm, such as the k-means clustering algorithm, mean-shift clustering algorithm, density-based spatial clustering of applications with noise, expectation-maximization clustering using Gaussian mixture models, agglomerative hierarchical clustering, etc.

An example of grouping the network latency data collected by monitor engine 201 is shown in FIG. 5.

Referring to FIG. 5, FIG. 5 illustrates the grouping of network latency data into clustered groups of network latency data using a cluster algorithm in accordance with an embodiment of the present disclosure.

As shown in FIG. 5, FIG. 5 is a graph 500 illustrating network latency 501 versus time 502 which depicts the distribution or groups of network latency data that was collected by monitor engine 201.

Returning to FIG. 4, in conjunction with FIGS. 1-3 and 5, in operation 403, execution time module 203 of performance analyzer 101 obtains the performance test execution times for a group of performance tests run in remote cluster environment 105 at different times. That is, execution time module 203 of performance analyzer 101 obtains the performance test execution times of running the performance tests on server cluster 104 in remote cluster environment 105 at different times.

When such performance tests are run, execution time module 203 obtains the execution time of such performance tests (referred to herein as the "performance test execution time"). In one embodiment, execution time module 203 obtains such execution times using various software tools, including, but not limited to, Linux® Trace Toolkit, worst-case execution time (WCET) tools, Timing Profiler, aiT, Bound-T, METAMOC, OTAWA developed by the University of Toulouse, TuBound, etc.

In operation 404, execution time module 203 of performance analyzer 101 obtains the performance test execution times for the same group of performance tests run in local cluster environment 103. That is, execution time module 203 of performance analyzer 101 obtains the performance test execution times for the same performance tests that are run on server cluster 102 of local cluster environment 103 as well as run on server cluster 104 of remote cluster environment 105.

In one embodiment, an original version of the performance test is run in either the local cluster environment 103 or the remote cluster environment 105 and a duplicate copy of the performance test is run in the other environment. In this manner, the same performance test is run at the same time in both local cluster environment 103 and remote cluster environment 105.

As discussed above, the performance execution time in local cluster environment 103 should not be affected by network latency since server cluster 102 is directly connected to performance analyzer 101 (not connected to performance analyzer 101 via a network). As a result, such a performance execution time reflects the true performance execution time (execution time of the performance test) when there is no network latency.

By obtaining the performance test execution time in both the local cluster environment 103 and the remote cluster environment 105, the network latency affecting such a performance test execution time ("compensation time") in remote cluster environment 105 may now be determined by comparing the performance execution time in remote cluster environment 105 (affected with network latency) with the performance execution time in local cluster environment 103 (not affected with network latency).

In operation 405, execution time module 203 of performance analyzer 101 determines the test execution times impacted by network latency (compensation times) based on the obtained performance execution times in local and remote cluster environments 103, 105.

As stated above, execution time module 203 is configured to determine test execution times impacted by network latency (referred to herein as the "compensation times") based on such obtained performance test execution times in both the local and remote cluster environments 103, 105. That is, execution time module 203 determines the compensation times based on the obtained performance test execution times in remote cluster environment 105 and the obtained performance test execution times in local cluster environment 103 for the same performance tests. Each of these compensation times represents a test execution time impacted by network latency as discussed above.

In one embodiment, the compensation time (test execution time impacted by network latency) is equal to the performance test execution time in remote cluster environment 105 minus the performance test execution time in local cluster environment 103 for the same performance test run in both local cluster environment 103 and remote cluster environment 105. In one embodiment, an original version of the performance test is run in either the local cluster environment 103 or the remote cluster environment 105 and a duplicate copy of the performance test is run in the other environment at the same time. In this manner, the same performance test is run at the same time in both local cluster environment 103 and remote cluster environment 105.

In operation 406, cluster module 202 of performance analyzer 101 groups the compensation times (determined in operation 405) using a cluster algorithm.

As discussed above, in one embodiment, cluster module 202 groups the compensation times, which are determined by execution time module 203, using a cluster algorithm, such as the k-means clustering algorithm, mean-shift clustering algorithm, density-based spatial clustering of applications with noise, expectation-maximization clustering using Gaussian mixture models, agglomerative hierarchical clustering, etc.

An example of grouping the compensation times determined by execution time module 203 is shown in FIG. 6.

Referring to FIG. 6, FIG. 6 illustrates the grouping of compensation times into clustered groups of compensation times using a cluster algorithm in accordance with an embodiment of the present disclosure.

As shown in FIG. 6, FIG. 6 is a graph 600 illustrating the evaluation times impacted by network latency (compensation time) 601 versus the performance tests 602, where graph 600 depicts the distribution or groups of compensation times that was determined by execution time module 203.

Returning to FIG. 4, in conjunction with FIGS. 1-3 and 5-6, in operation 407, regression model builder 204 of performance analyzer 101 builds a regression model to predict the performance test execution time impacted by network latency (compensation time) using a regression algorithm that uses the clustered groups of network latency data and the clustered groups of compensation times.

As stated above, in one embodiment, regression model builder 204 builds a regression model using a regression algorithm that uses the clustered groups of network latency data (e.g., network latency between master and slave in seconds) and the clustered groups of compensation times (e.g., compensation times from network latency in seconds). Such clustered groups are then used by a regression algorithm to build a regression model to predict the execution time impacted by the network latency. Examples of such regression algorithms include, but not limited to, linear regression, support vector regression, regression trees, decision tree, lasso regression, random forest, etc.

An example of using information from such clustered groups (clustered groups of network latency data as shown in FIG. 5 and clustered groups of compensation times as shown in FIG. 6) to build a regression model by the regression algorithm is shown in FIG. 7.

FIG. 7 illustrates the information from the clustered groups of network latency data and the clustered groups of compensation times, which is used by the regression algorithm to build the regression model in accordance with an embodiment of the present disclosure.

Referring to FIG. 7, in conjunction with FIGS. 5-6, such information from the clustered groups of network latency data and the clustered groups of compensation times may be stored in a data structure 700 (e.g., table) as shown in FIG. 7. In one embodiment, data structure 700 may be stored in a storage device (e.g., memory 305, disk unit 308) of performance analyzer 101.

As shown in FIG. 7, data structure 700 includes information pertaining to the clustered groups of network latency data, such as network latency with the master 701 (in seconds), network latency between the master and slave #1 702 (in seconds), network latency between the master and slave #2 703 (in seconds), network latency between the master and slave #3 704 (in seconds), and so forth.

Furthermore, as shown in FIG. 7, data structure 700 includes information pertaining to the clustered groups of compensation times, such as the compensation time from the network latency 705 (in minutes).

Additionally, as shown in FIG. 7, each of such information may be associated with an identifier 706 (identified as "ID" in FIG. 7).

In one embodiment, the information stored in data structure 700 may then be used to build a regression model by a regression algorithm, where the regression model is configured to predict the execution time impacted by the network latency (compensation time) as shown in FIG. 8.

Referring to FIG. 8, FIG. 8 is a graph illustrating the prediction of the execution time impacted by the network latency (compensation time) by the regression model in accordance with an embodiment of the present disclosure.

As shown in FIG. 8, FIG. 8 is a graph 800 illustrating the linkage between the average network latency 801 (in seconds) and the execution time impacted by network latency 802 (in minutes).

After the regression model is built, an accurate execution time of a performance test (e.g., performance regression test) run on server cluster 104 (FIG. 1) in remote cluster environment 105 (FIG. 1) will be able to be identified by taking into consideration the impact, if any, of the network latency as discussed below in connection with FIG. 9.

FIG. 9 is a flowchart of a method 900 for accurately identifying the execution time of the performance test (e.g., performance regression test) run on server cluster 104 (FIG. 1) in remote cluster environment 105 (FIG. 1) by taking into consideration the impact of network latency in accordance with an embodiment of the present disclosure.

Referring to FIG. 9, in conjunction with FIGS. 1-8, in operation 901, execution time module 203 of performance analyzer 101 collects the execution time of the performance test (e.g., performance regression test) run in remote cluster environment 105. That is, execution time module 203 collects the execution time of the performance test (e.g., performance regression test) run on server cluster 104 of remote cluster environment 105.

As discussed above, execution time module 203 obtains or collects the execution time of the performance test run in remote cluster environment 105 using various software tools, including, but not limited to, Linux® Trace Toolkit, worst-case execution time (WCET) tools, Timing Profiler, aiT, Bound-T, METAMOC, OTAWA developed by the University of Toulouse, TuBound, etc.

In operation 902, monitor engine 201 of performance analyzer 101 collects the real-time network latency when running the performance test in remote cluster environment 105. That is, monitor engine 201 collects the real-time network latency when running the performance test on server cluster 104 of remote cluster environment 105.

As stated above, monitor engine 201 monitors and collects the network latency data in remote cluster environment 105, using various software tools, including, but not limited to, SolarWinds® Network Performance Monitor, Paessler® Router Traffic Grapher, NetScan Tools, NetworkLatencyView from NirSoft, PingPlotter®, SolarWinds® NetFlow Traffic Analyzer, SolarWinds® Network Bandwidth Analyzer Pack, SolarWinds® Engineer's Toolset™, etc.

In operation 903, regression model builder 204 of performance analyzer 101 predicts the amount of the execution time of the performance test impacted by network latency (compensation time) using the built regression model.

As discussed above, in one embodiment, regression model builder 204 is configured to predict the amount of execution time of the performance test ("compensation time") that is impacted by the network latency using the regression model using the collected real-time network latency discussed above.

In operation 904, execution time generator 205 of performance analyzer 101 generates the accurate execution time of the performance test by subtracting compensation time predicted by the regression model (see operation 903) from the execution time of the performance test run in remote cluster environment 105 (see operation 901).

As stated above, in one embodiment, execution time generator 205 subtracts the amount of execution time of the performance test that is impacted by the network latency that is predicted by the regression model from the collected execution time of the performance test run in remote cluster environment 105 in order to obtain the accurate execution time of the performance test. Such an execution time of the performance test, such as the performance regression test, generated by execution time generator 205 is now more accurate as the network latency is taken into account. In this manner, a tester may be able to more correctly determine whether the performance test was valid or invalid.

As a result of the foregoing, embodiments of the present disclosure accurately identify the execution time of a performance test, such as a performance regression test, by taking into consideration the impact of network latency. By taking into consideration the performance impact from network latency, a more accurate execution time of the performance test is obtained thereby enabling the tester to more accurately determine whether the performance test was valid or invalid.

Furthermore, the principles of the present disclosure improve the technology or technical field involving performance testing, such as performance regression testing. As discussed above, performance regression testing may be performed on a server cluster in a network environment, such as remote network environment, which is used to handle big data (extremely large data sets that may be analyzed computationally to reveal patterns, trends, and associations, especially relating to human behavior and interactions). A "server cluster," as used herein, refers to two or more servers working together. Even though each sever in the server cluster has its own resources, it is displayed in the network under one host name and has only a single Internet Protocol (IP) address. Performance regression tests on such server clusters often require the need to test certain data many times. Such repetitive tests may span a long time for big data. At times, the running ability of the server cluster will be affected by the network performance, such as network latency, during different periods of time. Furthermore, at times, the tester will observe an increase in the duration of the execution time of the performance test, such as a performance regression test, running on the server cluster. Such an increase in the execution time may be attributed to network performance, such as network latency, which may cause the tester to improperly conclude that the performance test was invalid. Unfortunately, there is not currently a means for determining the extent of network latency affecting the execution time of the performance test, which may provide clarity as to whether or not the performance test was truly invalid. Additionally, there is not currently a means for obtaining an accurate execution time of the performance test, such as the performance regression test, that takes into account the network latency.

Embodiments of the present disclosure improve such technology by grouping network latency data into clustered groups of network latency data using a first cluster algorithm, such as the k-means clustering algorithm, mean-shift clustering algorithm, density-based spatial clustering of applications with noise, expectation-maximization clustering using Gaussian mixture models, agglomerative hierarchical clustering, etc. Furthermore, the performance test execution times for a group of performance tests run in a remote cluster environment are obtained at different times. That is, the performance test execution times of running the performance tests on a server cluster in the remote cluster environment are obtained at different times. Additionally, the performance test execution times for the same group of performance tests run in a local cluster environment are obtained. The test execution times impacted by network latency ("compensation times") are then determined based on such obtained performance test execution times in the local and remote cluster environments. In one embodiment, the compensation time (test execution time impacted by network latency) is equal to the performance test execution time for the performance test run in the remote cluster environment minus the performance test execution time for the same performance test run in the local cluster environment. Such compensation times are then grouped into clustered groups of compensation times using a second cluster algorithm, such as the k-means clustering algorithm, mean-shift clustering algorithm, density-based spatial clustering of applications with noise, expectation-maximization clustering using Gaussian mixture models, agglomerative hierarchical clustering, etc. A regression model is then built to predict a performance test execution time impacted by network latency using the clustered groups of network latency data and the clustered groups of compensation times. The execution time of a performance test run in the remote cluster environment is then generated that takes into consideration the performance test execution time impacted by network latency predicted by the regression model. In this manner, the execution time of the performance test, such as the performance regression test, is more accurate as the network latency is taken into account. Furthermore, in this manner, a tester is able to more correctly determine whether the performance test was valid or invalid. Additionally, in this manner, there is an improvement in the technical field involving performance testing, such as performance regression testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for accurately identifying an execution time of a performance test, the method comprising:
building a regression model to predict a performance test execution time impacted by network latency using clustered groups of compensation times; and
generating said execution time of said performance test run in a remote cluster environment that takes into consideration said performance test execution time impacted by network latency predicted by said regression model.

2. The method as recited in claim 1 further comprising:
collecting network latency data during different periods of time; and
grouping said collected network latency data using a cluster algorithm into clustered groups of network latency data.

3. The method as recited in claim 2 further comprising:
building said regression model to predict said performance test execution time impacted by network latency using said clustered groups of network latency data and said clustered groups of compensation times.

4. The method as recited in claim 1 further comprising:
collecting an execution time of said performance test run in said remote cluster environment.

5. The method as recited in claim 4 further comprising:
predicting an amount of execution time of said performance test impacted by network latency using said regression model.

6. The method as recited in claim 5 further comprising:
generating said execution time of said performance test by subtracting said amount of execution time of said performance test impacted by network latency from said execution time of said performance test run in said remote cluster environment.

7. The method as recited in claim 1 further comprising:
collecting a real-time network latency when running said performance test in said remote cluster environment; and
predicting an amount of execution time of said performance test impacted by network latency using said regression model using said collected real-time network latency.

8. A computer program product for accurately identifying an execution time of a performance test, the computer program product comprising one or more computer readable storage mediums having program code embodied therewith, the program code comprising programming instructions for:
building a regression model to predict a performance test execution time impacted by network latency using clustered groups of compensation times; and
generating said execution time of said performance test run in a remote cluster environment that takes into consideration said performance test execution time impacted by network latency predicted by said regression model.

9. The computer program product as recited in claim 8, wherein the program code further comprises the programming instructions for:
collecting network latency data during different periods of time; and
grouping said collected network latency data using a cluster algorithm into clustered groups of network latency data.

10. The computer program product as recited in claim 9, wherein the program code further comprises the programming instructions for:
building said regression model to predict said performance test execution time impacted by network latency using said clustered groups of network latency data and said clustered groups of compensation times.

11. The computer program product as recited in claim 8, wherein the program code further comprises the programming instructions for:
collecting an execution time of said performance test run in said remote cluster environment.

12. The computer program product as recited in claim 11, wherein the program code further comprises the programming instructions for:
predicting an amount of execution time of said performance test impacted by network latency using said regression model.

13. The computer program product as recited in claim 12, wherein the program code further comprises the programming instructions for:
generating said execution time of said performance test by subtracting said amount of execution time of said performance test impacted by network latency from said execution time of said performance test run in said remote cluster environment.

14. The computer program product as recited in claim 8, wherein the program code further comprises the programming instructions for:
collecting a real-time network latency when running said performance test in said remote cluster environment; and
predicting an amount of execution time of said performance test impacted by network latency using said regression model using said collected real-time network latency.

15. A system, comprising:
a memory for storing a computer program for accurately identifying an execution time of a performance test; and
a processor connected to said memory, wherein said processor is configured to execute program instructions of the computer program comprising:
building a regression model to predict a performance test execution time impacted by network latency using clustered groups of compensation times; and
generating said execution time of said performance test run in a remote cluster environment that takes into consideration said performance test execution time impacted by network latency predicted by said regression model.

16. The system as recited in claim 15, wherein the program instructions of the computer program further comprise:
collecting network latency data during different periods of time; and
grouping said collected network latency data using a cluster algorithm into clustered groups of network latency data.

17. The system as recited in claim 16, wherein the program instructions of the computer program further comprise:
building said regression model to predict said performance test execution time impacted by network latency using said clustered groups of network latency data and said clustered groups of compensation times.

18. The system as recited in claim 15, wherein the program instructions of the computer program further comprise:
collecting an execution time of said performance test run in said remote cluster environment.

19. The system as recited in claim 18, wherein the program instructions of the computer program further comprise:
predicting an amount of execution time of said performance test impacted by network latency using said regression model.

20. The system as recited in claim 19, wherein the program instructions of the computer program further comprise:
generating said execution time of said performance test by subtracting said amount of execution time of said performance test impacted by network latency from said execution time of said performance test run in said remote cluster environment.

* * * * *